(No Model.)
S. MERRIFIELD.
WHEELBARROW.
No. 458,182. Patented Aug. 25, 1891.
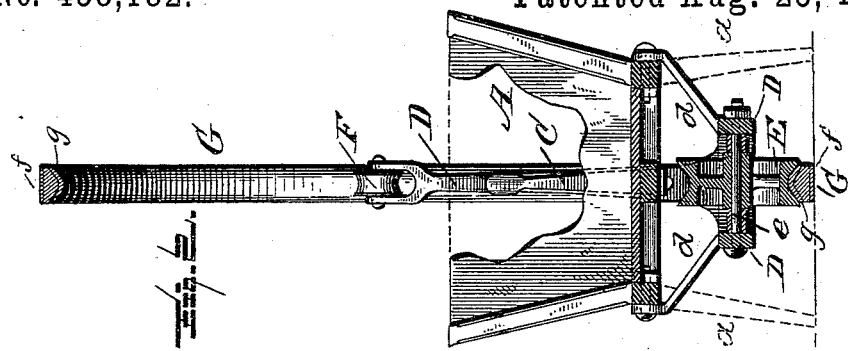
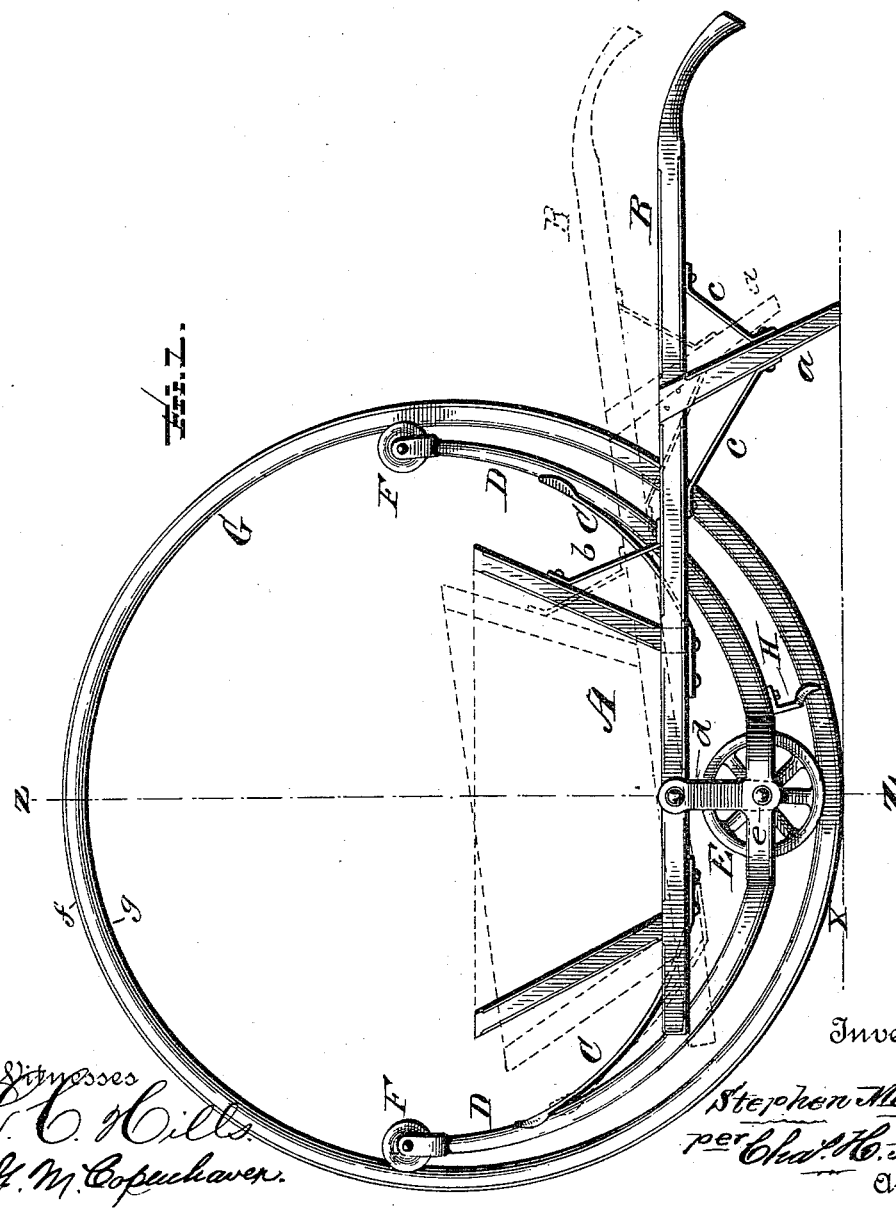
Witnesses
L. C. Hills.
G. M. Copenhaver.
Inventor
Stephen Merrifield
per Chas. H. Fowler
Attorney

UNITED STATES PATENT OFFICE.

STEPHEN MERRIFIELD, OF BLOOMINGDALE, MICHIGAN.

WHEELBARROW.

SPECIFICATION forming part of Letters Patent No. 458,182, dated August 25, 1891.

Application filed November 3, 1890. Serial No. 370,106. (No model.)

*To all whom it may concern:*

Be it known that I, STEPHEN MERRIFIELD, a citizen of the United States, residing at Bloomingdale, in the county of Van Buren and State of Michigan, have invented certain new and useful Improvements in Trucks and other Vehicles; and I do hereby declare that the following is a full, clear, and exact description of the same, reference being had to the annexed drawings, making a part of this specification, and to the letters of reference marked thereon.

Figure 1 of the drawings represents a side elevation of my invention as applied to a truck or wheelbarrow, showing the same in a tilted position in dotted lines; Fig. 2, a sectional elevation taken on line $x\,x$ of Fig. 1.

The present invention has for its object to improve the construction of that class of vehicles including trucks, wheelbarrows, carts, traction-engines, and the like, which are designed for carrying heavy loads, whereby the power required is reduced to a minimum; and the invention consists in the details of construction, substantially as shown in the drawings, and hereinafter described and claimed.

In the accompanying drawings, A represents the body of a truck or wheelbarrow, which may have a box-shaped body or not, as preferred, or otherwise constructed to adapt it for the purpose intended, any particular shape of body or platform not being essential to the successful operation of my invention. This body or platform is provided with suitable handles B, to which are connected, in any preferred manner, suitable supports $a$, said body and handles being strengthened by diagonal braces $b\,c$, respectively.

The body A or platform of the truck or wheelbarrow, or to whatever class of vehicle my invention is applied, is provided with bearing-springs C, which may be attached to any portion or part of the vehicle that will bring said spring in position to bear against upwardly-curved arms D. The arms D may be separate or formed of a continuous piece of metal or other material, with a hanger $d$, which is pivoted or otherwise suitably connected to the body or platform of the truck or wheelbarrow or to any other part of the vehicle found best adapted to the purpose. The arms are preferably bifurcated at their lower ends to come on each side of a wheel E, each extension of such bifurcation having a suitable hole therein to receive a short axle $e$ for supporting the wheel above mentioned, such construction being more clearly shown in Fig. 2.

To the upper ends of the arms D are suitably connected grooved rollers F, which bear upon the inner periphery of a large driving-wheel G, which is preferably of wood with a suitable tire $f$ thereon. The wheel, however, may be made hollow and of metal, if so preferred, as I do not wish to be understood to limit myself to the material used or any special manner of construction.

The interior periphery of the wheel G is rounded to fit in the grooves of the rollers F; and to insure the inner bearing-surface of the driving-wheel being kept clean and free from any grit or other foreign substance a scraper H is provided, which is preferably connected to one of the arms D. The wheel E is also grooved to engage with the inner periphery of the driving-wheel G. The inner periphery of said wheel G, as well as the outer periphery, is preferably provided with a tire $g$ to conform in shape to the rounded bearing-surface of the wheel.

In all cases it should be understood that the propelling power is applied to the truck, wheelbarrow, or other vehicle, the same moving forward, and the weight coming forward of the center of the driving-wheel G will put pressure on front bearing-spring C, which will in turn press the front arm D forward and the roller F in close contact with the inner periphery of the driving-wheel G. This action of the parts will shorten the distance between the load and fulcrum and at the same time lengthen the leverage between the front one of the rollers F and the fulcrum, which would be at X, as shown in Fig. 1, that portion of the driving-wheel becoming a lever and taking its center at the fulcrum. Thus the load is raised up and thrown over with great leverage without loss of motion in applying the power.

Any changes in the details of construction as would come within ordinary mechanical skill, I reserve the right to make without departing from the principle of my invention, as it is evident that many changes will be found necessary in the application of the invention to various forms of vehicles.

Having now fully described my invention, what I claim as new, and desire to secure by Letters Patent, is—

The combination, with a truck, wheelbarrow, or other like vehicle provided with suitable handles and having the grooved wheel E, of the large driving-wheel G, the upwardly-extending arms D, carrying the grooved rollers F, and the springs C, connected at their lower ends to the vehicle-frame and extending upward with their free ends bearing on the arms D, substantially as and for the purpose set forth.

In testimony that I claim the above I have hereunto subscribed my name in the presence of two witnesses.

STEPHEN MERRIFIELD.

Witnesses:
FRED LOCKARD,
CHAS. D. GRIFFEN.